United States Patent
Farhi et al.

(10) Patent No.: US 12,001,918 B2
(45) Date of Patent: Jun. 4, 2024

(54) CLASSIFICATION USING QUANTUM NEURAL NETWORKS

(71) Applicant: Google LLC, Mountain View, CA (US)

(72) Inventors: Edward Henry Farhi, Venice, CA (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 630 days.

(21) Appl. No.: 16/962,348

(22) PCT Filed: Jan. 16, 2019

(86) PCT No.: PCT/US2019/013792
§ 371 (c)(1),
(2) Date: Jul. 15, 2020

(87) PCT Pub. No.: WO2019/143680
PCT Pub. Date: Jul. 25, 2019

(65) Prior Publication Data
US 2020/0342345 A1    Oct. 29, 2020

Related U.S. Application Data

(60) Provisional application No. 62/618,935, filed on Jan. 18, 2018.

(51) Int. Cl.
*G06N 10/00*    (2022.01)
*G06N 3/063*    (2023.01)
(Continued)

(52) U.S. Cl.
CPC .............. *G06N 10/00* (2019.01); *G06N 3/063* (2013.01); *G06N 3/082* (2013.01); *G06N 3/084* (2013.01)

(58) Field of Classification Search
None
See application file for complete search history.

(56) References Cited

U.S. PATENT DOCUMENTS

2017/0351967 A1    12/2017    Babbush et al.

FOREIGN PATENT DOCUMENTS

WO    WO 2017/066695    4/2017

OTHER PUBLICATIONS

Verdon et al., Learning to learn with quantum neural networks via classical neural networks, arXiv:1907.05415v1 [quant-ph]; Jul. 11, 2019; pp. 1-12 (Year: 2019).*

(Continued)

*Primary Examiner* — Alan Chen
(74) *Attorney, Agent, or Firm* — Fish & Richardson P.C.

(57) ABSTRACT

This disclosure relates to classification methods that can be implemented on quantum computing systems. According to a first aspect, this specification describes a method for training a classifier implemented on a quantum computer, the method comprising: preparing a plurality of qubits in an input state with a known classification, said plurality of qubits comprising one or more readout qubits; applying one or more parameterised quantum gates to the plurality of qubits to transform the input state to an output state; determining, using a readout state of the one or more readout qubits in the output state, a predicted classification of the input state; comparing the predicted classification with the known classification; and updating one or more parameters of the parameterised quantum gates in dependence on the comparison of the predicted classification with the known classification.

17 Claims, 5 Drawing Sheets

(51) Int. Cl.
G06N 3/082 (2023.01)
G06N 3/084 (2023.01)

(56) References Cited

OTHER PUBLICATIONS

CA Office Action in Canadian Application No. 3,088,650, dated Aug. 16, 2021, 5 pages.
Aasen et al., "Milestones Toward Majorana-Based Quantum Computing," Phys. Rev. X, Aug. 3, 2016, 28 pages.
Monz et al., "Realization of a scalable Shor algorithm," Science, Mar. 4, 2016, 351:1068-1070.
Ofek et al., "Extending the lifetime of a quantum bit with error correction in superconducting circuits," Nature, Jul. 20, 2016, 536:441-445.
Riste et al., "Detecting bit-flip errors in a logical qubit using stabilizer measurements," Nature Communications, Apr. 29, 2015, 6 pages.
Sete et al., "A functional architecture for scalable quantum computing," IEEE International Conference on Rebooting Computing, Oct. 2016, pp. 1-6.
Yan et al., "The flux qubit revisited to enhance coherence and reproducibility," Nature Communications, Nov. 3, 2016, 9 pages.
Arjovsky et al, "Unitary Evolution Recurrent Neural Networks" arXiv, Nov. 2015, 11 pages.
AU Office Action in Australian Application No. 2019209295, dated Nov. 6, 2020, 4 pages.
Barenco et al, "Elementary gates for quantum computation" arXiv, Mar. 1995, 31 pages.
Barends et al, "Superconducting quantum circuits at the surface code threshold for fault tolerance" Nature, 2015, 4 pages.
Bengio et al, "Deep Learning" MIT Press, Oct. 2015, 705 pages.
Biamonte et al., "Quantum Machine Learning", Arxiv.org, Cornell University Library, dated Nov. 2016, 13 pages.
Cao et al, "Quantum Neuron: an elementary building block for machine learning on quantum computers" arXiv, Nov. 2017, 30 pages.
Corcoles et al, "Demonstration of a quantum error code using a square lattice for four superconducting qubits" Nature Communications, 2015, 10 pages.
Cybenko, "Approximation by Superpositions of Sigmoidal Functions" Mathematics of Control, Signals, and Systems, 1989, 12 pages.
Debnath et al, "Demonstration of a small programmable quantum computer with atomic qubits" arXiv, Aug. 2016, 10 pages.
Dunjko et al, "Super-polynomial separations for quantum-enhanced reinforcement learning" arXiv, Oct. 2017, 23 pages.
Farhi et al., "Quantum Algorithms for Fixed Qubit Architectures", Arvix.org, Cornell University Library, dated Mar. 2017, 20 pages.
Hornik, "Approximation Capabilities of Multilayer Feedforward Networks" Neural Networks, 1991, 7 pages.
Hyland et al, Learning Unitary Operators with Help from u(n), arXiv, Jul. 2016, 9 pages.
ibm.com [online], "IBM Announces Advances to IBM Quantum Systems & Ecosystem" 2017, retrieved on Dec. 8, 2020, retrieved from URL <https://www-03.ibm.com/press/us/en/pressrelease/53374.wss.>, 3 pages.
LeCun et al, "Deep Learning" Review, May 2015, 9 pages.
LeCun et al, "MNIST handwritten digit database".
Liu et al., "A Novel Text Classifier Based on Quantum Computation", Proceedings of the 51st Annual Meeting of the Association for Computational Linguistics, dated Aug. 2013, 5 pages.
Otterbach et al, "Unsupervised Machine Learning on a Hybrid Quantum Computer" arXiv, Dec. 2017, 17 pages.
PCT International Preliminary Report on Patentability in International Appln No. PCT/US2019/013792, dated Jul. 30, 2020, 11 pages.
PCT International Search Report and Written Opinion in International Appln No. PCT/US2019/013792, dated Apr. 23, 2019, 72 pages.
Rebentrost et al, "Quantum Support Vector Machine for Big Data Classification" Physical Review Letters, Sep. 2014, 5 pages.
Riste et al, "Demonstration of quantum advantage in machine learning" arXiv, Dec. 2015, 12 pages.
Romero et al, "Quantum autoencoders for efficient compression of quantum data" arXiv, Dec. 2016, 8 pages.
Romero et al, "Strategies for quantum computer molecular energies using the unitary coupled cluster ansatz" arXiv, Jan. 2017, 18 pages.
Schuld et al., "An Introduction to Quantum Machine Learning", Contemporary Physics, dated Oct. 2014, 15 pages.
Shalev-Shwartz et al, "Failures of Gradient-Based Deep Learning" arXiv, Apr. 2017, 33 pages.
Trabelsi et al, "Deep Complex Networks" arXiv, May 2017, 14 pages.
Wan et al, "Quantum generalisation of feedforward neural networks" arXiv, Dec. 2016, 10 pages.
yann.lecun.com [online], "MNIST handwritten digit database" 2010, retrieved on Dec. 8, 2020, retrieved from URL <http://yann.lecun.com/exdb/mnist/>, 8 pages.
Yoo et al, "A quantum speedup in machine learning" finding a N-bit Boolean function for a classification arXiv, Oct. 2014, 15 pages.
AU Office Action in Australian Appln. No. 2021257928, dated Oct. 4, 2022, 3 pages.
EP Office Action in European Appln. No. 19705431.5, dated Sep. 23, 2022, 10 pages.
Li et al., "Model and algorithm of quantum-inspired neural network with sequence input based on controlled rotation gates," Applied Intelligence, May 30, 2013, 40(1):107-126.
Office Action in Chinese Appln. No. 201980009225.4, dated Apr. 8, 2023, 22 pages (with English translation).
Notice of Allowance in Australian Appln. No. 2021257928, dated Jun. 1, 2023, 3 pages.
Office Action in Chinese Appln. No. 201980009225.4, mailed on Dec. 21, 2023, 16 pages (with English translation).
Office Action in Chinese Appln. No. 201980009225.4, mailed on Mar. 26, 2024, 15 pages (with English translation).
Office Action in European Appln. No. 19705431.5, mailed on Feb. 19, 2024, 10 pages.

* cited by examiner

CLASSIFICATION USING QUANTUM NEURAL NETWORKS

This application is a National Stage Application under 35 U.S.C. § 371 and claims the benefit of International Application No. PCT/US2019/013792, filed Jan. 16, 2019, which claims priority to U.S. Application No. 62/618,935, filed Jan. 18, 2018, the disclosure of which is incorporated herein by reference.

FIELD

This disclosure relates to classification methods that can be implemented on quantum computing systems. This disclosure also relates quantum computing systems.

BACKGROUND

Quantum computers are computing devices that exploit quantum superposition and entanglement to solve certain types of problem faster than a classical computer. The building blocks of a quantum computer are qubits. Qubits are effectively two level systems whose state can be in a superposition of its two states, rather than just in either of the two states as is the case for a classical bit.

Classical machine learning is the field of study where a classical computer or computers learn to perform classes of tasks using the feedback generated from the experiences or data gathered that the machine learning process acquires during computer performance of those tasks.

SUMMARY

Various embodiments of the invention include methods and systems, which are characterized by what is stated in the independent claims. Various embodiments of the invention are disclosed in the dependent claims.

According to a first aspect, this specification describes a method for training a classifier implemented on a quantum computer, the method comprising: preparing a plurality of qubits in an input state with a known classification, said plurality of qubits comprising one or more readout qubits; applying one or more parameterised quantum gates to the plurality of qubits to transform the input state to an output state; determining, using a readout state of the one or more readout qubits in the output state, a predicted classification of the input state; comparing the predicted classification with the known classification; and updating one or more parameters of the parameterised quantum gates in dependence on the comparison of the predicted classification with the known classification.

The method may further comprise iterating until one or more threshold conditions are met.

The method may further comprise determining the readout state of the one or more readout qubits, wherein determining the readout state comprises repeatedly: preparing the plurality of qubits in the input state; applying the parameterised quantum gates to the input state; and measuring the readout state of the one or more readout qubits. where $\theta$ is a parameter parameterising the quantum gate and $\Sigma$ is a generalised Pauli operator acting on one or more of the plurality of qubits.

Comparing the predicted classification with the known classification may comprise determining an estimated sample loss.

Updating the one or more parameters may comprise modifying a parameter to decrease the estimated sample loss.

The method may comprise modifying the one or more parameters using a gradient descent method.

The parameterised quantum gates may each implement a one parameter unitary transformation.

Each of the parameterised quantum gates may comprise one of: a single qubit quantum gate; a two qubit quantum gate; or a three qubit quantum gate.

One or more of the quantum gates may implements a unitary transformation of the form:

$$\exp(i\theta\Sigma),$$

where $\theta$ is a parameter parameterising the quantum gate and $\Sigma$ is a generalised Pauli operator acting on one or more of the plurality of qubits.

The input state may comprise a superposition of binary strings.

The input state may comprise an arbitrary quantum state.

The method may comprise using a classical artificial neural network to prepare the input state.

The method may comprise determining the classifier from the readout state using a classical artificial neural network.

The method may further comprise: applying the one or more parameterised unitary operators to transform a plurality of qubits from an unclassified input state to a classifying output state; determining a readout state from measurements on one or more readout qubits in the classifying output state; and classifying the unclassified input state in dependence on the readout state.

According to a second aspect, this specification describes a method of classification performed using a quantum computer, the method comprising: applying one or more parameterised unitary operators to transform a plurality of qubits from an input state to an output state, parameters of the one or more parameterised quantum gates determined using the classifier training method of the first aspect; determining a readout state from measurements on one or more readout qubits in the output state; and classifying the input state in dependence on the readout state.

According to a third aspect, this specification describes a quantum computing system comprising: a plurality of qubits; and one or more parameterised quantum gates, wherein the system is configured to perform the method of any of the aspects described herein.

According to a fourth aspect, this specification describes a quantum computing system comprising: a plurality of qubits; and one or more parameterised quantum gates, wherein the system is configured to: prepare the plurality of qubits in an input state with a known classification, said plurality of qubits comprising one or more readout qubits; apply the one or more parameterised quantum gates to the plurality of qubits to transform the input state to an output state; determine, using a readout state of the one or more readout qubits in the output state, a predicted classification of the input state; compare the predicted classification with the known classification; and update one or more parameters of the parameterised quantum gates in dependence on the comparison of the predicted classification with the known classification.

According to a fifth aspect, this specification describes a quantum computing system comprising: a plurality of qubits; and one or more parameterised quantum gates, wherein the system is configured to: apply the one or more parameterised unitary operators to transform the plurality of qubits from an unclassified input state to an classifying output state, parameters of the one or more parameterised quantum gates determined using a classifier trained using a method comprising: preparing a plurality of qubits in an input state with a known classification, said plurality of qubits comprising one or more readout qubits; applying one or more parameterised quantum gates to the plurality of qubits to transform the input state to an output state; determining, using a readout state of the one or more readout qubits in the output state, a predicted classification of the input state; comparing the predicted classification with the known classification; and updating one or more parameters of the parameterised quantum gates in dependence on the comparison of the predicted classification with the known classification; determine a readout state from measurements on one or more readout qubits in the classifying output state; and classify the unclassified input state in dependence on the readout state.

BRIEF DESCRIPTION OF THE DRAWINGS

For a more complete understanding of the methods, apparatuses and systems described herein, reference is now made to the following drawings in which.

DETAILED DESCRIPTION

Figure 1:
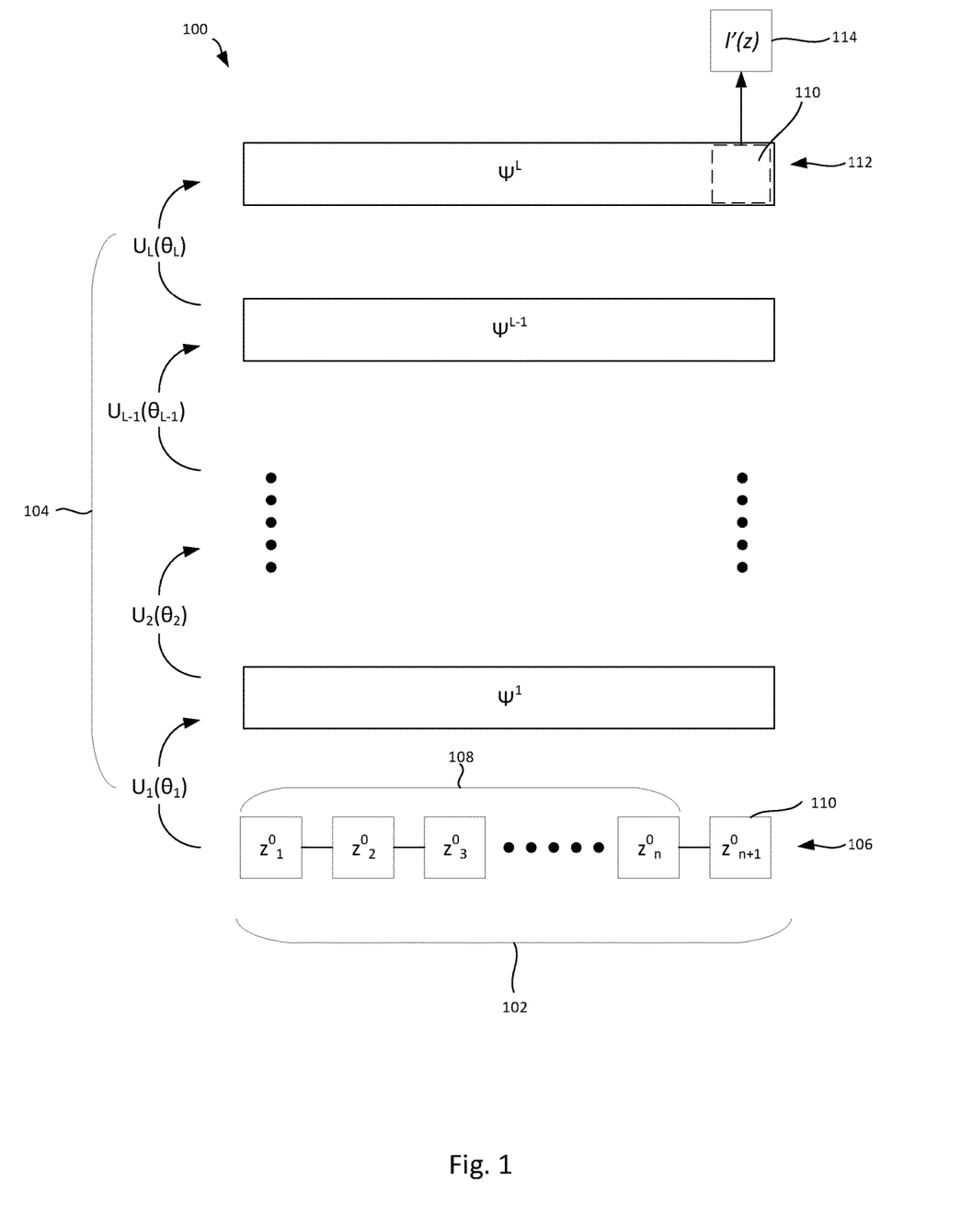
FIG. 1 shows a schematic example of a classification method performed using a quantum computer according to embodiments.

FIG. 1 shows a schematic overview of the operation of a classification system implemented using a quantum computer.

The classification method is performed using a quantum computing system 100 comprising a plurality of qubits 102. The qubits 102 can, for example, be (the following is a non-exhaustive list) superconducting qubits (for example, an "Xmon" or a "Gmon" qubit), quantum dots, ionised atoms in ion traps, or spin qubits. The qubits 102 can be kept at a sufficiently low temperature to maintain coherence between qubits throughout the execution of quantum algorithms. In embodiments where superconducting qubits are used, the temperature is kept below the superconducting critical temperature. The plurality of qubits 102 can, in some embodiments, comprise one or more ancilla qubits (not shown) for storing entangled quantum states.

The quantum computing system 100 further comprises one or more parameterised quantum gates 104 for implementing one or more parameterised unitary transformations $U_j(\theta_j)$ (herein also referred to as "unitaries") on the plurality of qubits 102. A quantum gate 104 comprises a quantum circuit that operates on one or more of the qubits 102 to perform a logical operation. A non-exhaustive list of quantum gates 104 includes Hadamard gates, C-Not gates, phase shift gates, Toffoli gates and/or controlled-U gates. Each quantum gate 104 acts on either an input state 106 or the output of the previous quantum gate 104 in a sequence. The parameterised quantum gates 104 act on the plurality of qubits 102 to change the state of the plurality of qubits 102. In the example shown, L quantum gates 104 are applied in sequence to an input state 106, each one transforming the state of the plurality of qubits 102.

The system is configured to learn parameters of the quantum gates 104 that, when applied to an input state $|\psi, m\rangle$ 106 comprising a state to be classified $|\psi\rangle$ 108 and one more readout qubits $|m\rangle$ 110, produce an output state 112 from which a predicted classification $l'(z)$ 114 (also referred to herein as a predicted label function or predictor) of the state to be classified $|\psi\rangle$ 106 can be determined. Measurements are performed on one or more readout qubits 110 in the plurality of qubits 102 in order to determine the predicted classification 114 of the input state 106 from the output state 112. In the embodiment shown in FIG. 1, only one readout qubit 110 is used, resulting in a binary predicted classifier. However, in general, any number of readout qubits 110 can be used to implement other types of classifier. The qubits representing the state to be classified 108 can be referred to as "data qubits".

The system 100 uses supervised learning to learn parameters of the quantum gates 104 that can obtain a predicted classification $l'(z)$ 114 of an input state 106. Sample states 108 with known classifications $l(z)$ (also referred to herein as label functions) are selected from a sample data set S for use in the supervised learning and an input state 106 comprising the sample state 108 and one or more readout qubits 110 is prepared. Starting from an initial set of parameters for the quantum gates 104, a first selected input state 106 has the one or more quantum gates 104 applied to it to generate an output state 112. The states of the one or more readout qubits 110 of the output state 112 are measured to determine a predicted classifier 114 for the sample state 108. The predicted classifier 114 is compared with the known classification of the sample state 108, for example using a sample loss function, and the comparison is used to update is the parameters of the quantum gates 10.

The process is iterated, each time with a further sample state 108 with a known classification selected from the training dataset S, until some predetermined threshold condition is met. The resulting parameters for quantum gates 104 can be used in quantum computers to implement a classification method on unclassified states. By analogy with classical artificial neural networks, the trained quantum classifier can be described as a "quantum neural network".

In contrast to previous proposals for machine learning on quantum computers, systems and methods described herein do not require the use of specialised quantum versions of classical artificial neural network "perceptrons". Furthermore, methods and systems described herein can be implemented using near-term available quantum computing systems. Systems and methods described herein can accept both classical quantum states as an input and classify them accordingly, in contrast with classical artificial neural networks, which can only take classical states as an input. The ability to classify input quantum states in this manner can be useful in quantum metrology, where entangled quantum states are used to make high resolution measurements.

In the near future gate model quantum computers with good enough fidelity to run circuits with enough depth to perform tasks that cannot be simulated on classical computers are expected to be available. One approach to designing quantum algorithms to run on such devices is to let the architecture of the hardware determine which gate sets to use. The methods described herein, in contrast to prior work, set up a general framework for supervised learning on quantum devices that is particularly suited for implementation on quantum processors available in the near term.

Figure 2:
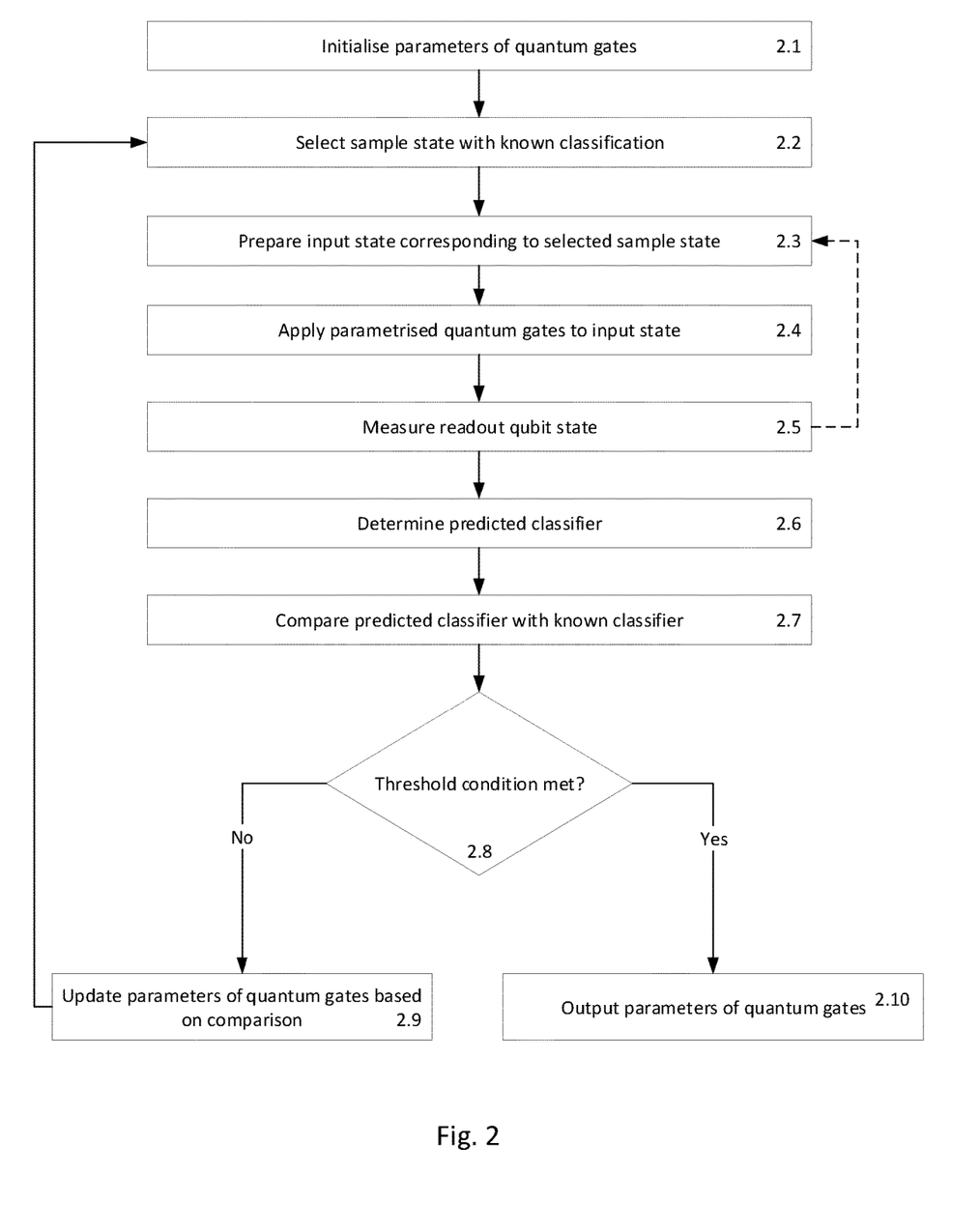
FIG. 2 shows a flow diagram of a method for training a classifier using a quantum computer according to embodiments.

FIG. 2 shows a flow diagram of a method for training a classifier implemented on a quantum computer, according to embodiments.

At operation 2.1, an initial set of the quantum gate parameters, $\vec{\theta}$, is provided for use with the quantum gates 104. The initial set of parameters can, for example, be chosen at random or chosen based on some predefined conditions or best guesses.

In some embodiments, the sequence of quantum gates 104 comprises L unitary is operators chosen from some set of experimentally available unitary operators. The sequence of quantum gates 104 implements a unitary operator $U(\vec{\theta})$, given by:

$$U(\vec{\theta}) = U_L(\theta_L) U_{L-1}(\theta_{L-1}) \ldots U_1(\theta_1).$$

Here, $\vec{\theta}$ is a vector of the parameters $(\theta_L, \theta_{L-1}, \ldots \theta_1)$ and $U_l(\theta_l)$ is the unitary operator implemented by the $l^{th}$ quantum gate.

In general, each of the parameters $\theta_l$ may comprise a plurality of parameters, for example in the form of a vector. In some embodiments, each of the quantum gates is characterised by a single scalar valued parameter. In these embodiments, each quantum gate is parameterised by a single parameter.

In some embodiments, the quantum, gates 104 implement unitary operators of the form:

$$U_l(\theta_l) = \exp(i\theta_l \Sigma_l),$$

where $\Sigma$ is a generalised Pauli operator acting on one or more qubits. In other words, $\Sigma$ is tensor product of operators from the set $\{\sigma_x, \sigma_y, \sigma_z\}$ that acts on one or more qubits in the plurality of qubits 102. An operator of this form has a gradient with respect to the parameter $\theta_l$ whose norm is bounded by 1. Thus the gradient of a sample loss function, as described below, with respect to $\vec{\theta}$, will be bounded, avoiding problems associated with gradients blowing up during the training of classical artificial neural networks.

The quantum gates 104 can be implemented in a number of ways, depending on, for example, the type of qubits 102 being used by the system. For example, in a superconducting qubit based system, the quantum gates can be implemented using an intermediate electric coupling circuit or a microwave cavity. In trapped spin based quantum computers, examples methods of implementing quantum gates include applying radiofrequency pulses to the qubits and taking advantage of spin-spin interactions to implement multi-qubit gates.

At operation 2.2, an n-qubit sample state $|\psi\rangle$ 108 with a known classification is selected from a training dataset S. The training dataset S comprises a plurality of sample states 106 each with a known classification. The selected sample state $|\psi\rangle$ 108 is then prepared in an input state 106 comprising the selected sample state 106 and one or more readout qubits 110 at operation 2.3. The readout qubits 110 can be prepared in a known state. For example, the input state 106 can be prepared in the form:

$$|in\rangle = |\psi, m\rangle,$$

where m represents m readout qubits 110 prepared in a known state.

At operation 2.4, the sequence of parameterised quantum gates 104 is applied to the selected input state 106 using the current set of parameters. The sequence of quantum gates 104 transforms the plurality of qubits 102 from the input state 106 to an output state 112 by applying unitary transformations.

At operation 2.5, a readout state of the one or more readout qubits 110 is measured. For example, one or more Pauli operators can be measured on the one or more readout qubits 110. In some embodiments, repeated measurements are taken of the readout qubits 110 to determine the readout state. To perform repeated measurements, operations 2.3 to 2.5 are repeated a predetermined number of times. In other words, the method comprises repeatedly preparing the plurality of qubits in the input state 106, applying the parameterised quantum gates 104 to the input state 106 and measuring the readout state of the one or more readout qubits.

At operation 2.6, a predicted classifier l'(z) 114 is determined from the measurements on the one or more readout qubits 110. In some embodiments, the predicted classifier 108 can be the state of the one or more readout qubits 110. For example, in a binary classifier, the result of a measurement of a Pauli operator on a readout qubit 110 can provide the predicted classification 114 directly. In other embodiments, the predicted classifier 114 can be a function of the readout state of the one or more readout qubits 110.

At operation 2.7, the predicted classifier 114 of the input state 106 is compared with the known classifier of the input state 106.

The predicted classifier 114 can be compared to the known classifier using a metric. For example, a sample loss function (or loss function) can be used to compare the predicted classifier 114 to the known classifier. The sample loss function provides a "cost" for mismatching known and predicted classifications. The sample loss function, can, for example, be a function that has a minimum value when the predicted classifiers 114 match the known classifiers. In these examples, the aim of the training method can be to reduce the average sample loss over the training set to below a threshold value.

There are many examples of sample loss functions that can be used to compare the known classification with the predicted classification 114. As an example, for a binary classifier $l(\psi)$ that classifies an input state as either +1 or −1, and with a single readout qubit initially set to 1 in the computational basis, an example sample loss that can be used is given by:

$$\text{loss}(\vec{\theta}, \psi) = 1 - l(\theta) \langle \psi, m | U^\dagger(\vec{\theta}) Y_{n+1} U(\vec{\theta}) | \psi, m \rangle,$$

where $Y_{n+1}$ is the $\sigma_y$ acting on the readout qubit. This sample loss has a minimum of zero, since the predicted label function (given by $l'(z) = \langle \psi, m | U^\dagger(\vec{\theta}) Y_{n+1} U(\vec{\theta}) | \psi, m \rangle$ in this example) is bounded to between −1 and 1.

At operation 2.8, a threshold condition is checked. The threshold condition is a condition for determining when to halt the training process. The threshold condition may comprise one or more of: a limit to the number of iterations of operations 2.2 to 2.8; a threshold error rate on a verification set of states; and/or one or more convergence criteria for the parameters $\vec{\theta}$.

At operation 2.9, if the threshold condition is not met, one or more of the parameters of the quantum gates 106 are updated in dependence on the comparison of the predicted classifier 108 of the input state 106 with the known classifier of the input state 106.

Figure 3:
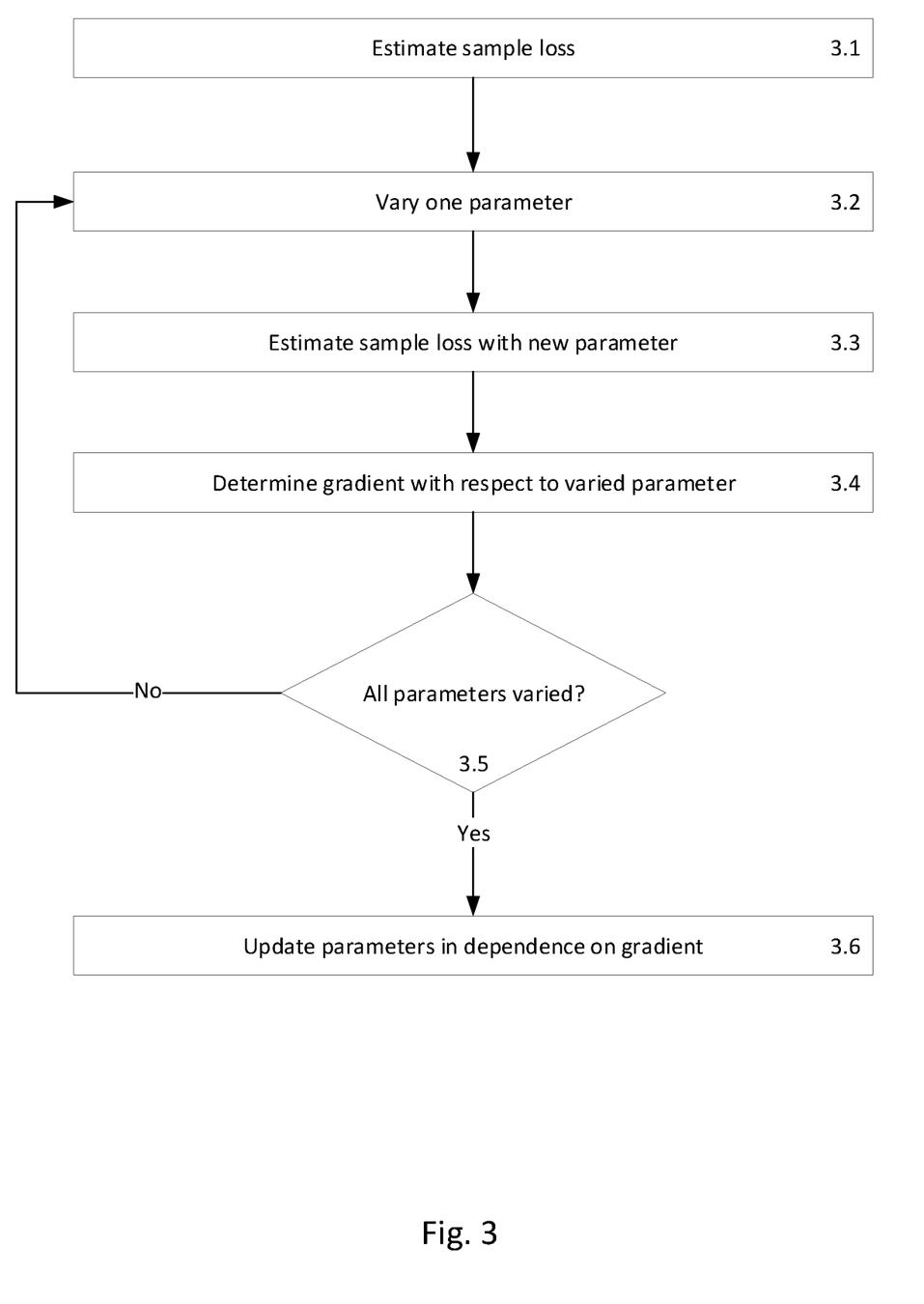
FIG. 3 shows a flowchart of an example of a method for updating quantum gate parameters using gradient descent according to embodiments.

In some embodiments, a gradient descent method is used to compare the predicted classifier of the input state 106 with the known classifier of the sample state 108 and update the parameters. FIG. 3 shows a flowchart of an example of a method for updating the parameters using gradient descent.

At operation 3.1, a sample loss is estimated. To estimate the sample loss, repeated measurements of the one or more readout qubits 110 in the output state 112 are made, and the sample loss is calculated from results of the measurements. Copies of the initial state 106 are repeatedly prepared and acted on by the quantum gates 104 to produce copies of the output state 112, and the readout qubits 110 for each copy of the output state 112 are measured. To achieve an estimate of the sample loss to within δ of the true sample loss at 99% probability, at least $2/\delta_2$ measurements of the readout state are made.

At operation 3.2, one of the unitary gate parameters is varied by a small value. The resulting set of parameters $\vec{\theta}\,'$ differs from the original set of parameters $\vec{\theta}$ a small amount in one component. The small amount can, for example, be a predetermined small amount. Alternatively, the small amount can, for example, be selected at random from a range of values.

At operation 3.3, a new sample loss with the varied parameter is determined. To this end, repeated measurements of the one or more readout qubits 110 are made on copies of the output state $U(\vec{\theta}\,')|\psi, m\rangle$. Copies of the initial state 106 are prepared and acted on by the quantum gates 104 to generate the copies of the output state 112, as directly copying the output state is forbidden by the "no-cloning theorem", and the readout qubits 110 for each copy are measured.

The gradient of the sample loss with respect to the varied component can then be calculated at operation 3.4. For example, a finite difference method can be used to determine the gradient.

At operation 3.5, if the gradient of the sample loss has not been calculated with respect to at least one of the parameters, the method returns to operation 3.2 and repeats operations 3.2 to 3.5 varying a different parameter each time. In total, for L parameters, the steps are repeated L times to obtain an estimate of the full gradient, $\vec{g}$, with respect to $\vec{\theta}$.

At operation 3.6, the parameters are updated in dependence on the estimated gradient. Given the estimated gradient, $\vec{g}$, the parameters are updated by changing them in the direction of $\vec{g}$. For example, the parameters can be updated using:

$$\theta \to \theta - r\left(\frac{\text{loss}(\vec{\theta}, \psi)}{\vec{g}^2}\right),$$

where r<1 is a "learning rate". The learning rate may be a fixed number. In some embodiments, the learning rate varies as the learning progresses.

With reference again to FIG. 2, if the threshold condition is not met, once one or more parameters have been updated the method returns to operation 2.2 and selects another training example (i.e. another sample state 108 with a known classification) and performs operations 2.3 to 2.8 with the updated quantum gate 104 parameters. In embodiments where a limit to the number of iterations is used as the threshold condition, an iteration count is increased by one.

If the threshold condition is met, the updated parameters are stored and/or output at operation 2.10. These "trained" parameters can be used to implement a classification method on a quantum computer, as described in relation to FIG. 4.

Figure 4:
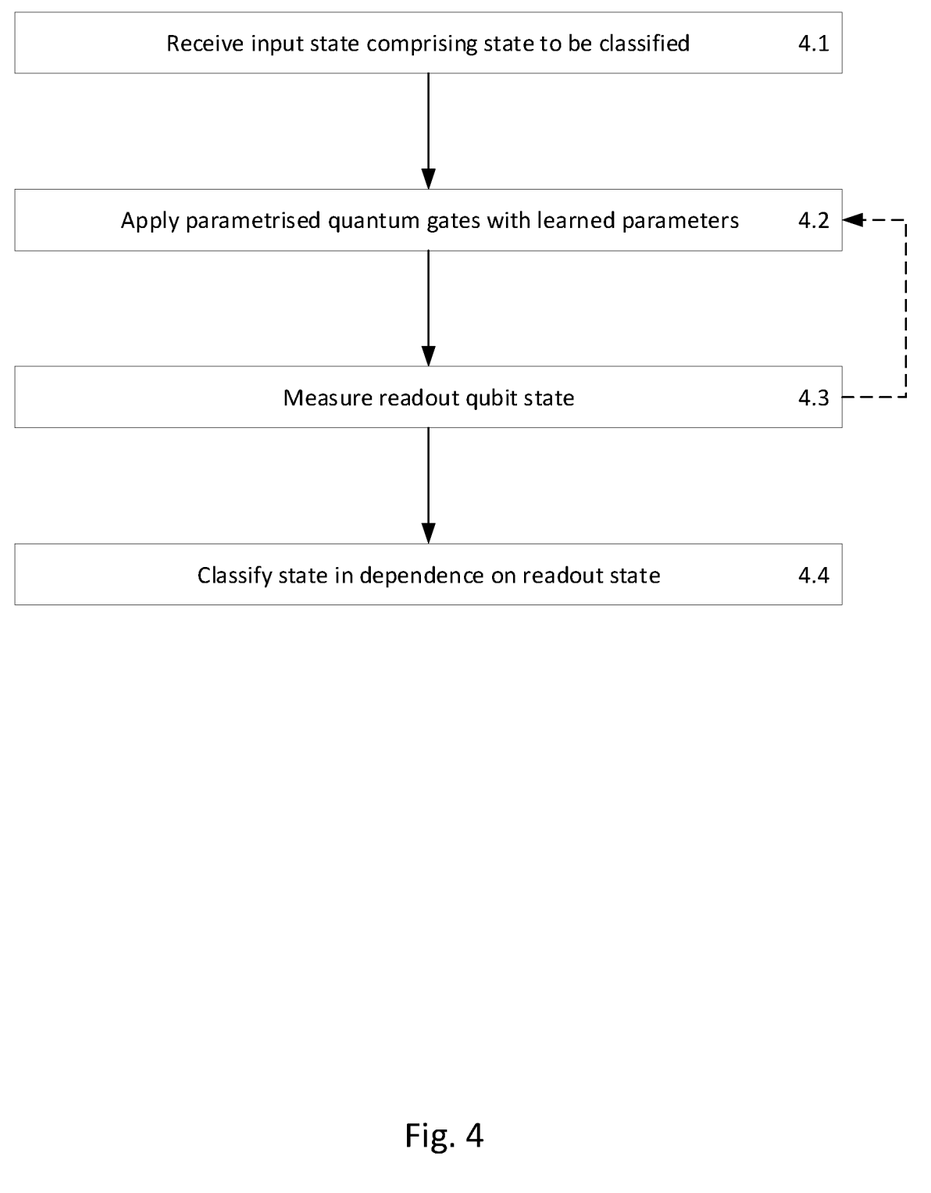
FIG. 4 shows a flow diagram of a method for classifying a quantum state according to embodiments.

FIG. 4 shows a flow diagram of a classification method implemented on a quantum computer. The method can use a classifier trained using the methods described in relation to FIGS. 1 to 3. The classification method can be used as a standalone method to classify an input state. Alternatively, the classification method can be used a subroutine in an algorithm that is at least in part implemented on a quantum computer. The classification method can, in some embodiments, be thought of a single pass through the training method, but without any comparison with a known classification or any updating of the weights of the parameterised quantum gates 104. The method can be implemented on a quantum computing system, such as the quantum computing system 100 described in relation to FIG. 1.

At operation 4.1 an unclassified input state is received. The unclassified input state comprises a plurality of qubits 102. The plurality of qubits 102 comprises n qubits representing a quantum state to be classified 108, and one or more readout qubits 110 in a known state. The quantum state is, in some embodiments, received from a routine running on a quantum or classical computer, and/or experimental equipment. Many other examples are possible. In some embodiments, the method encompasses preparing the input state 106 from a received quantum state to be classified 108.

At operation 4.2, a plurality of parameterised quantum gates 104 is applied to the input state 106 to transform the input state 106 to an output state 112. The parameters of the parameterised quantum gates 104 have been trained using any of the methods described in relation to FIGS. 1 to 3.

The quantum gates 104 can be implemented in a number of ways, depending on, for example, the type of qubits 102 being used by the system. For example, in a superconducting qubit based system, the quantum gates can be implemented using an intermediate electric coupling circuit or a microwave cavity. In trapped spin based quantum computers, examples methods of implementing quantum gates include applying radiofrequency pulses to the qubits and taking advantage of spin-spin interactions to implement multi-qubit gates.

In some embodiments, the quantum gates 104 used during the classification method are of the same type and implement the same unitary operations as the quantum gates 104 used in the training method. In other embodiments, the quantum gates 104 used during the classification method are of a different type, though still implement the same unitary operations as the quantum gates 104 used in the training method using the same parameters.

At operation 4.3, a readout state of the one or more readout qubits 110 is measured. For example, one or more Pauli operators can be measured on the one or more readout qubits 110. In some embodiments, the readout state is measured repeatedly to increase the accuracy of the readout state. Repeated measurement of the readout state comprises, for example applying the parameterised quantum gates 104 to copies of the input state 106 to generate an output state 112; and measuring the readout state of the one or more readout qubits 110 in the output state 112.

At operation 4.4, the quantum state to be classified is classified in dependence on the measured readout state. In some embodiments, the classification is provided directly by the measurements in the readout state. For example, in a binary classifier, a readout state of 1 or −1 may correspond to the classification. In other embodiments, the classification is provided by a function of the measured readout state.

By way of illustration, several example embodiments and applications will now be described. For convenience, each of these examples is described in relation to a binary classification and uses a single readout qubit, though it will be appreciated that the methods and systems can be extended to non-binary classification. For example, a plurality of readout qubits can be used to categorise an input state into one or more of a plurality of possible classifications.

In some embodiments, the system is configured to learn to classify classical binary states. The input states are taken from a set of binary strings $z=z_1 z_2 \ldots z_n$, where each $z_i$ is a binary bit. The binary bits can, for example, each take one of the values $\pm 1$. Alternatively, the binary bits can each take one of the values 0 or 1. For a binary string of length n there are $2^n$ of such strings. The training dataset comprises a sub-set of the possible binary strings, each with a known classification $l(z)$, which in this example is taken to be a binary label. The classification can, for example, represent a subset majority or a subset parity.

During training, a string $z^1$ is selected from the training dataset. A plurality of qubits 102 are prepared in an input state 106 to represent the selected string. For example, the input state 106 representing the string can be the n+1 qubit state prepared in a computational basis state:

$$|Z^1, r\rangle = |Z_1^1 Z_2^1 \ldots Z_n^1, m\rangle,$$

where m is the readout qubit 110 prepared in a known state. For example, the readout qubit 110 can be prepared in one of the binary states $\pm 1$.

The aim of the training is to make measurements of a property of the readout qubit in the output state correspond to the binary classifier $l(z)$. For example, the quantum gates can be trained such that a measurement of a Pauli operator on the readout qubit 110, which has possible values $\pm 1$, predicts a classification of the input string z. In the following, $\sigma_y$ is used as an example of the Pauli operator, though $\sigma_x$ or $\sigma_z$, could alternatively be used.

A sequence of parameterised quantum gates 106 is then applied to input state 106 to generate an output state 112 given by $$|out\rangle = U(\vec{\theta})|z^1, 1\rangle,$$

as described above in relation to FIG. 2. In embodiments where $\sigma_y$ is used as the measurement operator on the readout qubit of the output state, a sample loss function of the form $$loss(\vec{\theta}, z) = 1 - l(z)\langle z, 1|U^\dagger(\vec{\theta}) Y_{n+1} U(\vec{\theta})|z, 1\rangle,$$

can be used to train the parameters $\vec{\theta}$.

Before discussing specific examples of applying the method to binary strings, it will be established that the quantum neural network is capable of expressing any two valued label function, although possibly at a high cost in circuit depth. There are $2^n$, n-bit strings and accordingly there are $2^{(2^n)}$ possible binary label functions $l(z)$. Given a label function consider the operator whose action is defined on computational basis states as:

$$U_l|z, z_{m+1}\rangle = \exp(i\frac{\pi}{4}l(z)X_{n+1})|z, z_{m+1}\rangle,$$

where $X_{n+1}$ is a $\sigma_x$ operator acting on the readout qubit. $U_l$ acts by rotating the readout qubit by $$\frac{\pi}{4}$$

times the label of the string z. Correspondingly:

$$U_l^\dagger Y_{n+1} U_l = \cos\left(\frac{\pi}{2}l(z)\right)Y_{n+1} + \sin\left(\frac{\pi}{2}l(z)\right)Z_{n+1},$$

where here $l(z)$ is interpreted as being an operator diagonal in the computational basis. As $l(z)$ is +1 or −1 for a binary classifier, it can be seen that:

$$\langle z, 1|U_l^\dagger Y_{n+1} U_l|z, 1\rangle = l(z)$$

This demonstrates that at least at some abstract level there is a way of representing any label function with a quantum circuit.

$U_l$ can be written as a product of two qubit unitaries (i.e. implemented by a sequence of two qubit quantum gates). For this discussion it is convenient to switch to Boolean variables $b_i = \frac{1}{2}(1-z_i)$ and think of the label function $l(z)$ as $(1-2B)$ where B has the values 0 or 1. The Reed-Muller representation of a general B function in terms of the bits $b_1$ through $b_n$ can then be written as:

$$B = a_0 \oplus (a_1 b_1 \oplus a_2 b_2 \oplus \ldots a_n b_n) \oplus (a_{12} b_1 b_2 \oplus a_{13} b_1 b_3 \oplus \ldots) \oplus \ldots \oplus a_{123\ldots} b_1 b_2 \ldots b_n$$

The addition is mod2 and the coefficients a are all 0 or 1. Note that there are $2^n$ coefficients and since each can have the value $\pm 1$, $2^{(2^n)}$ Boolean functions are represented. The formula can be exponentially long.

The label dependent unitary $U_l$ can then be written as $$U_l = \exp(i\frac{\pi}{4}X_{n+1})\exp(-i\frac{\pi}{2}BX_{n+1}).$$

Viewed as an operator, diagonal in the computational z basis, we see that each term in the Reed-Muller representation of B commutes with each of the others. Each term in B in $U_l$ is multiplied by $X_{n+1}$ and so each term commutes with the others. Each non-vanishing term in the Reed-Muller representation gives rise in $U_l$ to a controlled bit flip on the readout qubit 110. To illustrate this using an example, consider a three bit term involving bits 2, 7 and 9. This corresponds to the operator: $b_2 = b_7 = b_9 = 1$ $$\exp\left(-i\frac{\pi}{2}b_2 b_7 b_9 X_{n+1}\right)$$

which is the identity unless $b_2 = b_7 = b_9 = 1$, in which case it is $-iX_{n+1}$. Any controlled one qubit unitary acting on qubit n+1 where the control is on the first n bits can be written as a product of $n^2$ two qubit unitaries. Therefore label function expressed in terms of the Reed-Muller formula with RM terms can be written as a product of RM commuting n+1 qubit operators and each of these can be written as $n^2$ two qubit unitaries. This quantum representation result is analogous to the classical representation theorem, which states that any Boolean label function can be represented on a depth three neural network with the inner layer having size $2^n$. Of course such gigantic matrices cannot be represented on a conventional computer. In this case the method is naturally performed in a Hilbert space of exponential dimension, but an exponential circuit depth may be needed to express certain functions.

Now that a representation of a binary function has been demonstrated, several example embodiments will now be described.

In some embodiments, the label function l(z) is a binary label indicating a parity of a subset, $\mathcal{S}$, of bits in an input binary string of length n. The Reed-Muller formula for a subset parity label is:

$$P_S(z) = \sum_{j=1}^{n} \oplus a_j b_j,$$

where $a_j=1$ if the bit $b_j$ is in the subset and $a_j=0$ if the bit $b_j$ is not in the subset. The addition is mod2. An example unitary that implements the subset parity is then given by:

$$U_{P_S} = \exp\left(i\frac{\pi}{4}X_{n+1}\right)\exp\left(-i\frac{\pi}{2}\sum_{j=1}^{n} a_j b_j X_{n+1}\right),$$

where $X_{n+1}$ is the Pauli operator $\sigma_x$ acting on the readout qubit 110. Here, the addition in the second exponent is automatically mod2 because of the factor of $$\frac{\pi}{2}$$

and the properties of $X_{n+1}$. The circuit consists of a sequence of (at most) n commuting two qubit gates 104, with the readout qubit being one of the two qubits acted on by each quantum gate 104.

This unitary can be learned using the training method described herein. Starting from the n-parameter unitary:

$$U(\vec{\theta}) = \exp\left(i\frac{\pi}{4}X_{n+1}\right)\exp\left(-i\sum_{j=1}^{n} \theta_j b_j X_{n+1}\right)$$

with random initial $\vec{\theta}$, the optimal parameters $$\theta_j = \frac{\pi}{2}$$

if the bit $b_j$ is in the subset and $\theta_j=0$ if the bit $b_j$ is not in the subset can be learned using the methods described in relation to FIG. 1. As an example, working from 6 to 16 bits and starting with a random $\theta_j$, with stochastic gradient descent the subset parity label function can be learned with far fewer than $2^n$ samples and therefore could successfully predict the label of unseen examples. Introducing a low level of label noise, for example up to 10% label noise, does not impede the learning.

In some embodiments, the label function l(z) is a binary label indicating a subset majority, $\mathcal{M}_S(z)$, of a subset, $\mathcal{S}$, of bits in an input binary string of length n. In the $z=\pm 1$ representation of the input string, the subset majority is +1 if the majority of bits in the subset are +1, and −1 otherwise. The subset majority can be written as:

$$\mathcal{M}_S(z) = \text{sign}\left(\sum_{j=1}^{n} a_j z_j\right),$$

where $a_j=1$ if the bit $b_j$ is in the subset and $a_j=0$ if the bit $b_j$ is not in the subset. Consider the unitary:

$$U_{\mathcal{M}_S} = \exp\left(i\frac{\beta}{2}\sum_{j=1}^{n} a_j Z_j X_{n+1}\right)$$

where $X_{n+1}$ is the Pauli operator $\sigma_x$ acting on the readout qubit 110 $Z_j$ is the Pauli operator $\sigma_z$ acting on the $j^{th}$ qubit, and $\beta$ is defined below. Conjugating $Y_{n+1}$ gives:

$$U_{\mathcal{M}_S}^{\dagger} Y_{n+1} U_{\mathcal{M}_S} = \cos\left(\beta\sum_{j=1}^{n} a_j Z_j\right)Y_{n+1} + \sin\left(\beta\sum_{j=1}^{n} a_j Z_j\right)Z_{n+1}$$

so that $$\langle z, 1 | U_{\mathcal{M}_S}^{\dagger} Y_{n+1} U_{\mathcal{M}_S} | z, 1 \rangle = \sin\left(\beta\sum_{j=1}^{n} a_j Z_j\right).$$

The maximum magnitude of the term $\Sigma_{j=1}^{n} a_j Z_j$ is n, so if $\beta$ is chosen to lie within the range $0<\beta<\pi/n$, for example $0.9\pi/n$ then, the subset majority will be:

$$\mathcal{M}_S(z) = \text{sign}\left(\sin\left(\beta\sum_{j=1}^{n} a_j Z_j\right)\right).$$

This means that taking repeated measurements of $Y_{n+1}$ and rounding the expected value up or down to ±1 can result in a perfect categorical error, even though the individual sample losses are not 1 or −1.

This unitary can be learned using the training method described herein. Starting from the n-parameter unitary $$U(\vec{\theta}) = \exp\left(-i\sum_{j=1}^{n} \theta_j Z_j X_{n+1}\right)$$

with random initial $\vec{\theta}$, the optimal parameters, $\theta_j=\beta$ if the bit $b_j$ is in the subset and $\theta_j=0$ if the bit $b_j$ is not in the subset, can be learned using the methods described in relation to FIG. 1.

The embodiments described above provide examples of training and using a binary classifier. In general, binary classifiers can be trained to represent any binary function. The quantum gates 104 used can be restricted to one and qubit unitary operators.

In some embodiments, the method and system can be used to train an image classifier. The training sets S in these embodiments comprise a plurality of images labelled with a known classification. For example, in the embodiments learning how to classify handwritten digits, the training set comprises a plurality of examples of handwritten digits, each with a label corresponding to the digit that the handwritten digit is meant to represent. An example of such a dataset is the MNIST dataset, which comprises 55,000 training samples of 28 by 28 pixel images representing digits between zero and nine that have been labelled by hand.

The input state for image classification comprises pixel data for the image being classified. For example, in a black and white image, each qubit in the input state can represent whether a pixel in the input image is black or white. In these examples, the input state can comprise n-qubits representing the n pixels of the image, and one or more readout qubits prepared in a known state. In some embodiments, the images being classified comprise one or more components/channels, for example representing colour data, brightness, and/or hue of the image. In these embodiments, each pixel in each channel may be represented by a qubit in the plurality of qubits 102.

For the image classification, single qubit quantum gates 104 are taken to be unitatries with Σ being an X, Y, and/or Z operator acting on any one of qubits in the plurality of qubits 102. Two qubit gates are, in general, taken to be XY, YZ, ZX, XX,YY and/or ZZ operators acting between any pair of different qubits in the plurality of qubits 102.

In some embodiments, a predefined number of parameterised gates 104 are selected at random from this set of possible quantum gates 104. For example, between 500 and 1000 quantum gates can be selected for a binary image classifier. The initial parameters of these quantum gates 104 can, in some embodiments, be selected at random.

In some embodiments, the two-qubit quantum gates 104 used in the image classification are restricted to be of the ZX or XX types. In some of these embodiments, at least one of the two qubits operated on by the two-qubit quantum gate is a readout qubit 110. Layers of quantum gates 104 of the same type may be alternated in the quantum computer. For example, the sequence of quantum gates may comprise alternating three layers ZX quantum gates with three layers of XX quantum gates. Each layer may comprise a plurality of quantum gates. Each layer may comprise two-qubit quantum gates operating between one or more of the readout qubits 110 and each of the other qubits in the plurality of qubits 102. For example, in a binary classifier, each layer may comprise n two-qubit quantum gates, each of which acts between the readout qubit 110 and a different one of the n qubits representing the state to be classified.

While embodiments described above have been described in relation to image classification, it should be understood that they can be equally applied to other classification types that receive strings as an input.

In contrast to classical artificial neural networks, the system described herein can accept quantum states (by which it is meant n-qubit states in an arbitrary superposition) as an input. The system can be used to train a classifier for quantum states to classify the quantum states according to a label that relates to a property of the quantum states.

Some further embodiments will now be described. In the embodiments described below, a binary classifier of the quantum states is used. However, the method can be extended to other classification types comprising more than two classifications by increasing the number of readout qubits.

The input state 106 comprises n qubits representing the state $|\psi\rangle$ to be classified, and one or more readout qubits 110. In the embodiments described below, one readout qubit is used, and is set to a known initial state of $|1\rangle$ in the computational basis, though other initial readout states can be used.

The binary classifier used in the example described below corresponds to whether an expected value of a Hamiltonian $\hat{H}$ with a state is positive or negative. This is equivalent to determining whether some Such a classifier can be useful when finding minimum energy states of system governed by a particular Hamiltonian. The classifier $l(|\psi\rangle)$ can be given, for example, by $$l(|\psi\rangle) = \text{sign}(\langle \psi|\hat{H}|\psi\rangle).$$

Consider the operator $$U_H(\beta) = \exp(i\beta H\, X_{n+1})$$

where β is taken to be a small positive number. Then $$\langle \psi, 1 | U_H^\dagger(\beta) Y_{n+1} U_H(\beta)|\psi,1\rangle = \langle \psi|\sin(2\beta H)|\psi\rangle.$$

For sufficiently small β, this is approximately $$2\beta\langle\psi|H|\psi\rangle$$

so the sign of the expected of our predicted label agreeing with the true label. In this sense the label function has been expressed with a quantum circuit with small categorical error. The error arises due to the approximation taken by expanding $\langle\psi|\sin(2\beta H)|\psi\rangle$ for small β. However if we take β to be much less than the inverse of the norm of H, the error can be made small.

For example, consider a graph where on each edge we have a ZZ coupling with a coefficient of +1 or −1 randomly chosen $$H = \sum_{\langle ij\rangle} J_{ij} Z_i Z_j$$

where the sum is restricted to edges in the graph and $J_{ij}$ is +1 or −1. Suppose there are M terms in H. We can first pick M angles ij and consider circuits that implement unitaries of the form:

$$U(\vec{\theta}) = \exp\left(i\sum_{\langle ij\rangle} \theta_{ij} Z_i Z_j X_{n+1}\right).$$

When $\theta_{ij} = \beta J_{ij}$, this unitary will provide the label function. These weights can be learned using the methods described above in relation to FIGS. 1 to 3.

The quantum states $|\psi\rangle$ live in a $2^n$ dimensional Hilbert space, so in some embodiments the quantum states are restricted to quantum states that can be built by applying few qubit unitaries to some simple product state. In some embodiments, the is training states are restricted to be of this form.

By way of example, eight data qubits and one readout qubit can be trained to classify three regular graphs, which accordingly have 12 edges. In this example, there are twelve parameters $\theta_{ij}$ used to form the sequence of quantum gates 102 $U(\vec{\theta})$. The training states can be product states that depend on eight random angles. The state can be formed by rotating each of the eight qubits, which each start as an eigenstate of the associated X operator, about the y axis by the associated random angle. Test states are formed in the same manner. Since the states are chosen randomly from a continuum there is a high probability that the training set and test set are distinct. After presenting roughly 1000 test states the quantum network correctly labels 97% of the test states.

In some embodiments, the class of unitaries can include more parameters. For example, two layers of unitaries where Σ is an XX and ZX, where the first operator acts on one of the eight data qubits and the second operator acts on the readout qubit 110. In the example using three regular graphs as the inputs, the learning procedure can achieve a categorical error of less than 3% after seeing roughly 1000 training examples.

In some embodiments, training a classifier for classical input states can be enhanced using the ability of the quantum system to accept quantum states as an input. For example, with a quantum neural network, input states may comprise classical data in a superposition. A single quantum state that is a superposition of computational basis states, each of which represents a single sample from a batch of samples, can be viewed as quantum encoding of the batch. Here different phases on the components give rise to different quantum states.

For example, consider a binary classification. The sample space can be divided into samples labeled as +1 and those labeled as −1. Consider the states $$|+1\rangle = N_+ \sum_{z:l(z)=1} e^{i\varphi_z}|z, 1\rangle$$

and $$|-1\rangle = N_- \sum_{z:l(z)=-1} e^{i\varphi_z}|z, 1\rangle$$

where $N_+$ and $N_-$ are normalization factors and $\varphi_z$ is a phase. In some examples, all the phases are set to zero. Each of these states can be viewed as a batch containing all of the samples with the same label. Return to the equation which gives the unitary associated with any label function. Note that the expected value of this operator of the state $|+1\rangle$ is +1 whereas the expected value of the state $|-1\rangle$ is −1. This is because the unitary is diagonal in the computational basis of the data qubits so the cross terms vanish and the phases are irrelevant. Now consider a parameter dependent unitary $U(\vec{\theta})$ which is diagonal in the computational basis of the data qubits. The expected value of $Y_{n+1}$ of the state obtained by having this operator in the act on $|+1\rangle$ is the average over all samples with the label +1 of the quantum neural network's predicted label values. For the state $|-1\rangle$, the expected value of $Y_{n+1}$ of the state obtained by having this operator in the act on $|-1\rangle$ is the average over all samples with the label −1 of the quantum neural network's predicted label values. In other words if $U(\vec{\theta})$ is diagonal in the computational basis of the data qubits then $$\langle +1|U^\dagger(\vec{\theta})Y_{n+1}U(\vec{\theta})|+1\rangle - \langle -1|U^\dagger(\vec{\theta})Y_{n+1}U(\vec{\theta})|-1\rangle$$

is the empirical risk of the whole sample space. If parameters $\vec{\theta}$ can be found that make this o, then the quantum neural network will correctly predict the label of any input from the training set.

In some embodiments, a gate set that is diagonal in the computational basis of the data qubits is used. An example of such a set is the generalised Pauli operators ZX and ZZX with the Z operators acting on data qubits and the X operator acting on the readout. Using these gates, the empirical risk formula is the empirical risk of the full data set for the quantum neural network. The empirical risk can be used as a sample loss function to train the parameters of the quantum neural network. Starting from a random choice of parameters, a minimisation algorithm, such as gradient descent, can be used to decrease the empirical risk.

In some embodiments, the gate set can be beyond those that are diagonal in the data qubit computational basis. In these embodiments, $$\langle +1|U^\dagger(\vec{\theta})Y_{n+1}U(\vec{\theta})|+1\rangle - \langle -1|U^\dagger(\vec{\theta})Y_{n+1}U(\vec{\theta})|-1\rangle$$

can no longer be directly read as the empirical risk of the quantum neural network acting on the whole sample space. However, driving it to a low value at least means that the states $|+1\rangle$ and $|-1\rangle$ are correctly labelled.

Figure 5A:
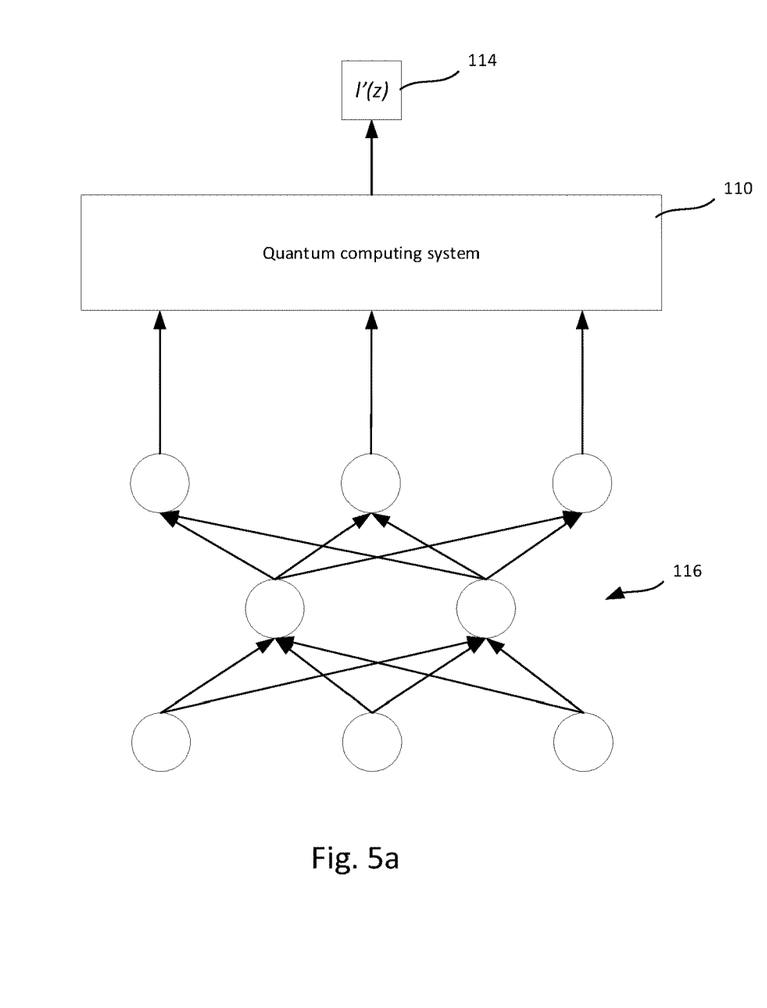
FIGS. 5a and 5b show a classification system comprising both a classical artificial neural network and a quantum neural network classifier according to embodiments.
Figure 5B:
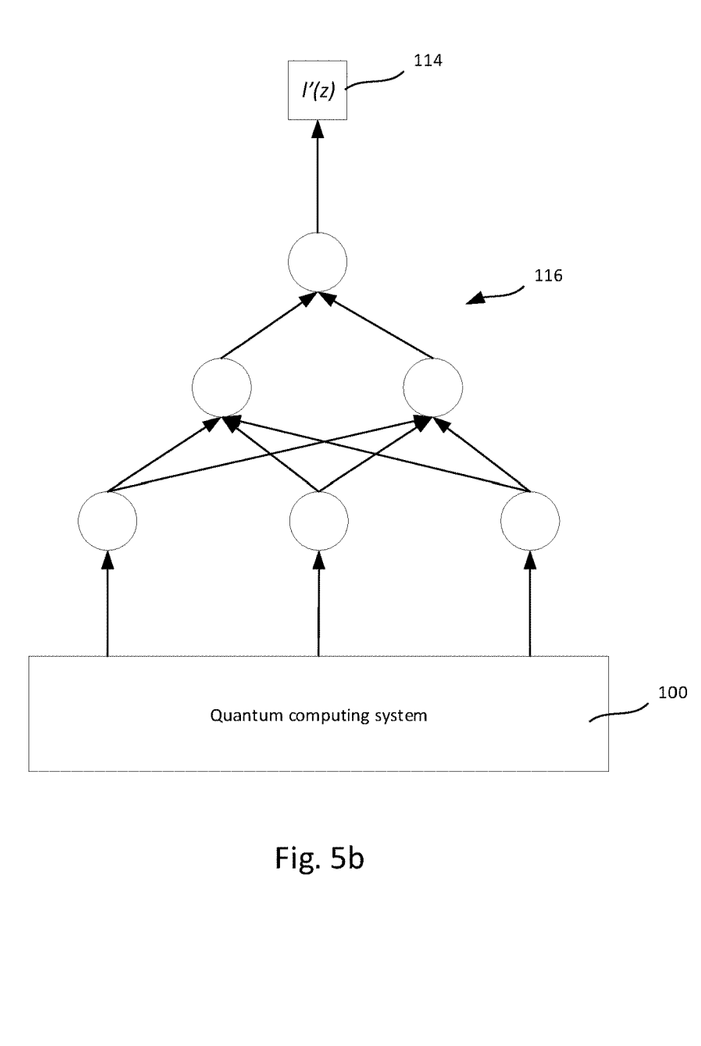

FIGS. 5a and 5b show examples of the quantum neural network classifier being used in conjunction with a classical artificial neural network. In general, the classification method implemented on a quantum computing system 100 as described herein can be combined with one or more classical artificial neural networks 116. This can improve the accuracy of the classification method.

The classical artificial neural networks 116 comprise a plurality of layers of "neurons" 118, each of which has connections 120 to one or more neurons in each neighbouring layer. In the example shown, the classical artificial neural networks 116 have three layers, though fewer or greater numbers of layers are possible. The examples also show fully connected layers, where each neuron 118 is connected to every neuron in neighbouring layers, though partially connected networks are also possible.

Each neuron 118 accepts one or more inputs, and outputs a function of the inputs that is characterised by one or more weights associated with each input. These weights can be trained using standard machine learning techniques to produce a desired output from the neural network 116.

In some embodiments, a state to be classified 108 is input into a classical artificial neural network 116. The output of the classical artificial neural network 116 can be used an input to the quantum computing system 100 in order to generate the input state 106 to be classified according the methods described above. An example of such an embodiment is shown in FIG. 5a.

In some embodiments, the readout state from readout qubits 110 in the quantum computing system 100 is input into a classical artificial neural network 116. The classical artificial neural network can be trained to determine, using the readout state of the output state of the one or more readout qubits in the plurality of qubits, a predicted classification of the input state. An example of such an embodiment is shown in FIG. 5 b.

Implementations of the quantum subject matter and quantum operations described in this specification may be implemented in suitable quantum circuitry or, more generally, quantum computational systems, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements may be used to perform quantum processing operations. That is, the quantum circuit elements may be configured to make use of quantum-mechanical phenomena, such as superposition and entanglement, to perform operations on data in a non-deterministic manner. Certain quantum circuit elements, such as qubits, may be configured to represent and operate on information in more than one state simultaneously. Examples of superconducting quantum circuit elements that may be formed with the processes disclosed herein include circuit elements such as co-planar waveguides, quantum LC oscillators, qubits (e.g., flux qubits or charge qubits), superconducting quantum interference devices (SQUIDs) (e.g., RF-SQUID or DCSQUID), inductors, capacitors, transmission lines, ground planes, among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analogue or digital form. In some implementations, classical circuit elements may be used to transmit data to and/or receive data from the quantum circuit elements through electrical or electromagnetic connections. Examples of classical circuit elements that may be formed with the processes disclosed herein include rapid single flux quantum (RSFQ) devices, reciprocal quantum logic (RQL) devices and ERSFQ devices, which are an energy-efficient version of RSFQ that does not use bias resistors. Other classical circuit elements may be formed with the processes disclosed herein as well.

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of implementations have been described. Nevertheless, it will be understood that various modifications may be made without departing from the spirit and scope of the invention. Other implementations are within the scope of the following claims.

The invention claimed is:

1. A method for training a classifier implemented on a quantum computer, the method comprising:
   preparing a plurality of qubits in an input state with a known classification, said plurality of qubits comprising one or more data qubits that represent a state to be classified and one or more readout qubits;
   applying one or more layers of parameterised quantum gates to the plurality of qubits to transform the input state to an output state, wherein each layer of parameterised quantum gates comprises a plurality of two-qubit quantum gates, each of the two-qubit quantum gates acting between a readout qubit and a different one of the data qubits;
   determining, using a readout state of the one or more readout qubits in the output state, a predicted classification of the input state;
   comparing the predicted classification with the known classification; and
   updating, during a training process, one or more trained parameters of the parameterised quantum gates in dependence on the comparison of the predicted classification with the known classification.

2. The method of claim 1, further comprising iterating until one or more threshold conditions are met.

3. The method of claim 2, further comprising determining the readout state of the one or more readout qubits, wherein determining the readout state comprises repeatedly:
   preparing the plurality of qubits in the input state;
   applying the parameterised quantum gates to the input state; and
   measuring the readout state of the one or more readout qubits.

4. The method of claim 1, wherein comparing the predicted classification with the known classification comprises determining an estimated sample loss.

5. The method of claim 4, wherein updating the one or more trained parameters comprises modifying a parameter to decrease the estimated sample loss.

6. The method of claim 5, comprising modifying the one or more trained parameters using a gradient descent method.

7. The method of claim 1, wherein the parameterised quantum gates each implement a one parameter unitary transformation.

8. The method of claim 7, wherein each of the parameterised quantum gates comprises one of: a single qubit quantum gate; a two qubit quantum gate; or a three qubit quantum gate.

9. The method of claim 7, wherein one or more of the quantum gates implements a unitary transformation of the form:

$$\exp(i\theta\Sigma),$$

where θ is a parameter parameterising the quantum gate and Σ is a generalised Pauli operator acting on one or more of the plurality of qubits.

10. The method of claim 1, wherein the input state comprises a superposition of binary strings.

11. The method of claim 1, wherein the input state comprises an arbitrary quantum state.

12. The method of claim 1, further comprising using a classical artificial neural network to prepare the input state, comprising:
   inputting an initial state to be classified into the classical artificial neural network; and
   providing an output of the classical artificial neural network to the quantum computer as the input state with the known classification.

13. The method of claim 1, comprising determining the predicted classification of the input state from the readout state using a classical artificial neural network, comprising:
   inputting the readout state into the classical artificial neural network, wherein the classical artificial neural network is trained to determine, using the readout state, the predicted classification of the input state.

14. The method of claim 1, further comprising:
   applying the one or more parameterised quantum gates to transform a plurality of qubits from an unclassified input state to a classifying output state;
   determining a readout state from measurements on one or more readout qubits in the classifying output state; and
   classifying the unclassified input state in dependence on the readout state.

15. A method of classification performed using a quantum computer, the method comprising:
   applying one or more layers of parameterised unitary operators to transform a plurality of qubits from an input state to an output state, wherein
      the plurality of qubits comprise one or more data qubits that represent the input state to be classified and one or more readout qubits; and
      each layer of parameterised unitary operators comprises a plurality of two-qubit quantum gates, each of the two-qubit quantum gates acting between a readout qubit and a different one of the data qubits, wherein parameters of the one or more parameterised unitary operators comprise trained parameters;
   determining a readout state from measurements on the one or more readout qubits in the output state; and
   classifying the input state in dependence on the readout state.

16. A quantum computing system comprising:
a plurality of qubits; and
one or more parameterised quantum gates,
wherein the system is configured to:
   prepare the plurality of qubits in an input state with a known classification, said plurality of qubits comprising one or more data qubits that represent a state to be classified and one or more readout qubits;
   apply one or more layers of the one or more parameterised quantum gates to the plurality of qubits to transform the input state to an output state, wherein each layer of parameterised quantum gates comprises a plurality of two-qubit quantum gates, each of the two-qubit quantum gates acting between a readout qubit and a different one of the data qubits;
   determine, using a readout state of the one or more readout qubits in the output state, a predicted classification of the input state;
   compare the predicted classification with the known classification; and
   update, during a training process, one or more trained parameters of the parameterised quantum gates in dependence on the comparison of the predicted classification with the known classification.

17. A quantum computing system comprising:
a plurality of qubits; and
one or more parameterised quantum gates,
wherein the system is configured to:
apply the one or more parameterised quantum gates to transform the plurality of qubits from an unclassified input state to an classifying output state, trained parameters of the one or more parameterised quantum gates determined using a classifier trained using a method comprising:
   preparing a plurality of qubits in an input state with a known classification, said plurality of qubits comprising one or more data qubits that represent a state to be classified and one or more readout qubits;
   applying one or more layers of the one or more parameterised quantum gates to the plurality of qubits to transform the input state to an output state, wherein each layer of parameterised quantum gates comprises a plurality of two-qubit quantum gates, each of the two-qubit quantum gates acting between a readout qubit and a different one of the data qubits;
   determining, using a readout state of the one or more readout qubits in the output state, a predicted classification of the input state;
   comparing the predicted classification with the known classification; and
   updating, during a training process, one or more trained parameters of the parameterised quantum gates in dependence on the comparison of the predicted classification with the known classification;
determine a readout state from measurements on one or more readout qubits in the classifying output state; and
classify the unclassified input state in dependence on the readout state.

* * * * *